(12) United States Patent
Choi et al.

(10) Patent No.: US 7,554,518 B2
(45) Date of Patent: Jun. 30, 2009

(54) LIQUID CRYSTAL DISPLAY

(75) Inventors: Pil-Mo Choi, Seoul (KR); Tae-Hyeong Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 636 days.

(21) Appl. No.: 11/336,148

(22) Filed: Jan. 19, 2006

(65) Prior Publication Data

US 2006/0164564 A1    Jul. 27, 2006

(30) Foreign Application Priority Data

Jan. 26, 2005    (KR) .................. 10-2005-0007127

(51) Int. Cl.
*G09G 3/36*    (2006.01)

(52) U.S. Cl. .................... 345/98; 345/204; 345/100

(58) Field of Classification Search .................. 345/87, 345/98, 100, 204, 1.3
See application file for complete search history.

(56) References Cited

U.S. PATENT DOCUMENTS

| | | | |
|---|---|---|---|
| 5,032,831 A | 7/1991 | Kuijk | |
| 5,200,876 A | 4/1993 | Takeda et al. | |
| 5,371,351 A | 12/1994 | Van Berkel | |
| 6,175,394 B1 | 1/2001 | Wu et al. | |
| 6,696,701 B2 | 2/2004 | Hector et al. | |
| 6,741,037 B2 | 5/2004 | Lee | |
| 6,954,184 B2 * | 10/2005 | Kurashima et al. | 345/1.3 |
| 2004/0075628 A1 * | 4/2004 | Chien et al. | 345/82 |

FOREIGN PATENT DOCUMENTS

| | | |
|---|---|---|
| JP | 06-011739 | 1/1994 |
| JP | 06-335162 | 2/1994 |
| JP | 08-162944 | 6/1996 |
| JP | 2000-260944 A | 9/2000 |
| JP | 2004-246202 A | 9/2004 |
| JP | 2004-271840 A | 9/2004 |
| JP | 2004-271970 A | 9/2004 |
| KR | 200122841 | 5/1998 |
| KR | 1020000000877 A | 1/2000 |
| KR | 1020000015308 A | 3/2000 |
| KR | 1020000019886 A | 4/2000 |
| KR | 1020000027711 A | 5/2000 |
| KR | 1020000060042 A | 10/2000 |

(Continued)

*Primary Examiner*—Amare Mengistu
*Assistant Examiner*—Koosha Sharifi
(74) *Attorney, Agent, or Firm*—Haynes and Boone, LLP

(57) ABSTRACT

A liquid crystal display includes first to third voltage lines disposed along an edge of the panel unit in a ring shape, fourth to sixth voltage lines disposed along an edge of the panel unit in a ring shape and at outer sides of the first to third voltage lines, respectively, a first diode unit including a first diode group connected in series between the second voltage line and the fifth voltage line wherein the first diode group includes a plurality of diodes, and a second diode unit including a second diode group connected in series between the third voltage line and the sixth voltage line wherein the second diode group includes a plurality of diodes. One end of each of the data lines is connected between the first diode group and the other end thereof is connected between the second diode group via the transmission gate.

12 Claims, 9 Drawing Sheets

FOREIGN PATENT DOCUMENTS

| KR | 1020010045688 A | 6/2001 |
| KR | 100312759 | 10/2001 |
| KR | 100386849 | 5/2003 |
| KR | 1020040015584 A | 2/2004 |
| KR | 100433691 | 5/2004 |

* cited by examiner

LIQUID CRYSTAL DISPLAY

BACKGROUND OF THE INVENTION (a) Field of the Invention

The present invention relates to a liquid crystal display.

(b) Description of Related Art

Generally, a liquid crystal display (LCD) includes a liquid crystal (LC) panel unit including two panels provided with pixel electrodes and common electrodes, and an LC layer with dielectric anisotropy interposed therebetween. The pixel electrodes are arranged in a matrix and are connected to switching elements such as thin film transistors (TFT) to be sequentially applied with a data voltage for a row. The common electrodes cover the entire surface of the upper panel and are supplied with a common voltage. A pixel electrode, a common electrode, and the LC layer form an LC capacitor in a circuital view, and the LC capacitor together with a switching element connected thereto is a basic unit of a pixel.

The LCD is device which displays images by applying an electric field to a liquid crystal layer disposed between two panels and regulating the strength of the electric field to adjust a transmittance of light passing through the liquid crystal layer. Meanwhile, for preventing the LC layer from deteriorating due to a one-directional electric field, the polarity of the data voltage is reversed for each frame, for each row, or for each dot with respect to the common voltage, or the polarities of the data voltage and the common voltage are reversed together.

The LCD, as a small and medium sized display device, is used with a so-called dual display device that is being developed vigorously and which has panel units in each of its inner and outer sides.

The dual display device includes a main panel unit mounted on the inner side, a subsidiary panel unit mounted on the outer side, a driving flexible printed circuit film (FPC) provided with signal lines to transmit input signals from external devices, an auxiliary FPC connecting the main panel unit to the subsidiary panel unit, and an integration chip which controls the above-described elements.

The LCD includes a panel unit provided with pixels including switching elements and display signal lines, a gate driver providing a gate-on voltage and a gate-off voltage for gate lines of the display signal lines to turn on/off the switching elements, and a data driver providing a data signal for data lines of the display signal lines to apply a data voltage to the pixels via the turned-on switching elements, and the integration chip generates control signals and driving signals for controlling the main panel unit and the subsidiary panel unit, which is generally mounted as a COG (chip on glass) type. Additionally, the gate driver may be formed with the switching elements to be integrated on the edge of the panel unit.

Respective high voltage and low voltage lines are disposed at inner and outer sides along the edge of the panel unit in order to prevent electrostatic damage in the process of manufacturing the LCD. A diode unit including a plurality of diodes is connected between the high voltage line and the low voltage line, and the data lines are connected to the diode unit to release an electrostatic charge that penetrates into a center of the panel unit to the outside via a predetermined path, thereby protecting the panel unit.

The high and low voltage lines are connected between the integration chip and the gate driver, and transmit the gate-on voltage and the gate-off voltage, respectively, in a normal operation mode, e.g., for a mobile phone.

The integration chip applies a ground voltage of 0V to the low voltage line and 2.8V to 3.0V to the high voltage line in a stand-by mode in which it does not operate. In this way, when the stand-by mode is changed into the operation mode, a load of the high voltage line decreases to accelerate the operation of the integration chip upon application of the gate-on voltage having a relatively higher voltage to the high voltage line.

In this case, the diode functions as a resistor at its own turn-off to play a role in dividing a voltage between the high voltage line and the low voltage line. When leakage current flows in the data lines connected to the diode unit, the current is charged in the liquid crystal capacitor via the switching element to represent a pixel voltage. Thus, the liquid crystal is operated, thereby displaying stripes along the data lines in the stand-by mode of not displaying images.

SUMMARY OF THE INVENTION

The present invention is directed to solving a stripe fault.

A liquid crystal display including a panel unit having two panels and a liquid crystal layer interposed between the two panels is provided, which includes a plurality of pixels each including a switching element, gate lines and data lines connected to the switching elements, a gate driver applying gate signals to the gate lines, a driving circuitry chip applying data voltages to the data lines, a plurality of transmission gates connected between the data lines and the driving circuitry chip, first to third voltage lines disposed along an edge of the panel unit in a ring shape, fourth to sixth voltage lines disposed along an edge of the panel unit in a ring shape and disposed at outer sides of the first to third voltage lines, respectively, a first diode unit including a first diode group connected in series between the second voltage line and the fifth voltage line wherein the first diode group includes a plurality of diodes, and a second diode unit including a second diode group connected in series between the third voltage line and the sixth voltage line wherein the second diode group includes a plurality of diodes.

One end of each of the data lines is connected between the first diode group and the other end thereof is connected between the second diode group via the transmission gate, and at least one of a first point of contact between the data line and the first diode group and a second point of contact between the data line and the second diode group has less than a threshold voltage of the liquid crystal. The first and second diode groups may be connected in a backward direction. The first point of contact may be positioned close to the fifth voltage line, and the second point of contact may be positioned close to the sixth voltage line. The first and second points of contact may be positioned close to the fifth and sixth voltage lines, respectively.

The diodes may include transistor gates and drains which are connected to each other, respectively, and may have equal resistances at the time of their own turn-off. The first and second points of contact may be positioned at centers of the first and second diode groups, respectively.

The diodes may include transistor gates and drains which are connected to each other, wherein at least one of a resistance of diodes positioned between the first point of contact and the fifth voltage line and a resistance of diodes positioned between the second point of contact and the sixth voltage line may be less than at least one of a resistance of diodes positioned between the second point of contact and the second voltage line and a resistance of diodes positioned between the second point of contact and the third voltage line.

The liquid crystal display may further include a gate voltage generator generating a gate-on voltage for turning on the switching element and a gate-off voltage for turning off the switching element. The driving circuitry chip may include the gate voltage generator, and it may be mounted on the panel unit as a COG (chip on glass) type. The gate driver may be integrated on the panel unit.

Meanwhile, first and second diodes may be disposed on the second voltage line and they are connected in directions opposite to each other, and third and fourth diodes are disposed on the third voltage line and they are connected in directions opposite to each other. The first and second diodes are positioned outside a point of contact between the second voltage line and the first diode unit, the third and fourth diodes are positioned outside a point of contact between the third voltage line and the second diode unit, and the first and second diodes and the third and fourth diodes are connected in anode terminals thereof.

The first and second diode group may be connected in a backward direction. The first point of contact may be positioned close to the fifth voltage line. The second point of contact may be positioned close to the sixth voltage line. The first and second points of contact are positioned close to the fifth and sixth voltage lines, respectively.

The diodes may include transistor input terminals and control terminals which are connected to each other, respectively, and have equal resistances at the time of their own turn-off. The first and second points of contact may be positioned at centers of the first and second diode groups, respectively.

The diodes may include transistor input terminals and control terminals which are connected to each other, wherein at least one of a resistance of diodes positioned between the first point of contact and the fifth voltage line and a resistance of diodes positioned between the second point of contact and the sixth voltage line is less than at least one of a resistance of diodes positioned between the second point of contact and the second voltage line and a resistance of diodes positioned between the second point of contact and the third voltage line.

The liquid crystal display may further include a gate voltage generator generating a gate-on voltage for turning on the switching element and a gate-off voltage for turning off the switching element.

The driving circuitry chip may include the gate voltage generator. The driving circuitry chip may be mounted on the panel unit as a COG (chip on glass) type. The gate driver may be integrated on the panel unit.

Meanwhile, first and second resistors are disposed on the second voltage line, and third and fourth resistors are disposed on the third voltage line. The first and second resistors are positioned outside a point of contact between the second voltage line and the first diode unit, and the third and fourth resistors are positioned outside a point of contact between the third voltage line and the second diode unit.

The first and second diode group may be connected in a backward direction. The first point of contact may be positioned close to the fifth voltage line. The second point of contact may be positioned close to the sixth voltage line. The first and second points of contact are positioned close to the fifth and sixth voltage lines, respectively.

The diodes may include transistor input terminals and control terminals of which are connected to each other, respectively, and have equal resistances at the time of their own turn-off. The first and second points of contact may be positioned at centers of the first and second diode groups, respectively.

The diodes may include transistor input terminals and control terminals which are connected to each other, wherein at least one of a resistance of diodes positioned between the first point of contact and the fifth voltage line and a resistance of diodes positioned between the second point of contact and the sixth voltage line is less than at least one of a resistance of diodes positioned between the second point of contact and the second voltage line and a resistance of diodes positioned between the second point of contact and the third voltage line.

The liquid crystal display may further include a gate voltage generator generating a gate-on voltage for turning on the switching element and a gate-off voltage for turning off the switching element. The driving circuitry chip may include the gate voltage generator. The driving circuitry chip may be mounted on the panel unit as a COG (chip on glass) type. The gate driver may be integrated on the panel unit.

In the meantime, the second voltage line has first and second disconnection units, and the third voltage line has third and fourth disconnection units, wherein the first and second diodes are positioned outside a point of contact between the second voltage line and the first diode unit, and the third and fourth diodes are positioned outside a point of contact between the third voltage line and the second diode unit.

The first and second diode groups may be connected in a backward direction. The first point of contact may be positioned close to the fifth voltage line. The second point of contact may be positioned close to the sixth voltage line. The first and second points of contact are positioned close to the fifth and sixth voltage lines, respectively.

The diodes may include transistor input terminals and control terminals which are connected to each other, respectively, and have equal resistances at the time of their own turn-off. The first and second points of contact may be positioned at centers of the first and second diode groups, respectively.

The diodes may include transistors input terminals and control terminals of which are connected to each other, wherein at least one of a resistance of diodes positioned between the first point of contact and the fifth voltage line and a resistance of diodes positioned between the second point of contact and the sixth voltage line is less than at least one of a resistance of diodes positioned between the second point of contact and the second voltage line and a resistance of diodes positioned between the second point of contact and the third voltage line.

The liquid crystal display may further include a gate voltage generator generating a gate-on voltage for turning on the switching element and a gate-off voltage for turning off the switching element. The driving circuitry chip may include the gate voltage generator. The driving circuitry chip may be mounted on the panel unit as a COG (chip on glass) type. The gate driver may be integrated on the panel unit.

BRIEF DESCRIPTION OF THE DRAWINGS

The present invention will be better appreciated from the following description of the preferred embodiments thereof taken in conjunction with the accompanying drawings, in which.

DETAILED DESCRIPTION OF EMBODIMENTS

Figure 1:
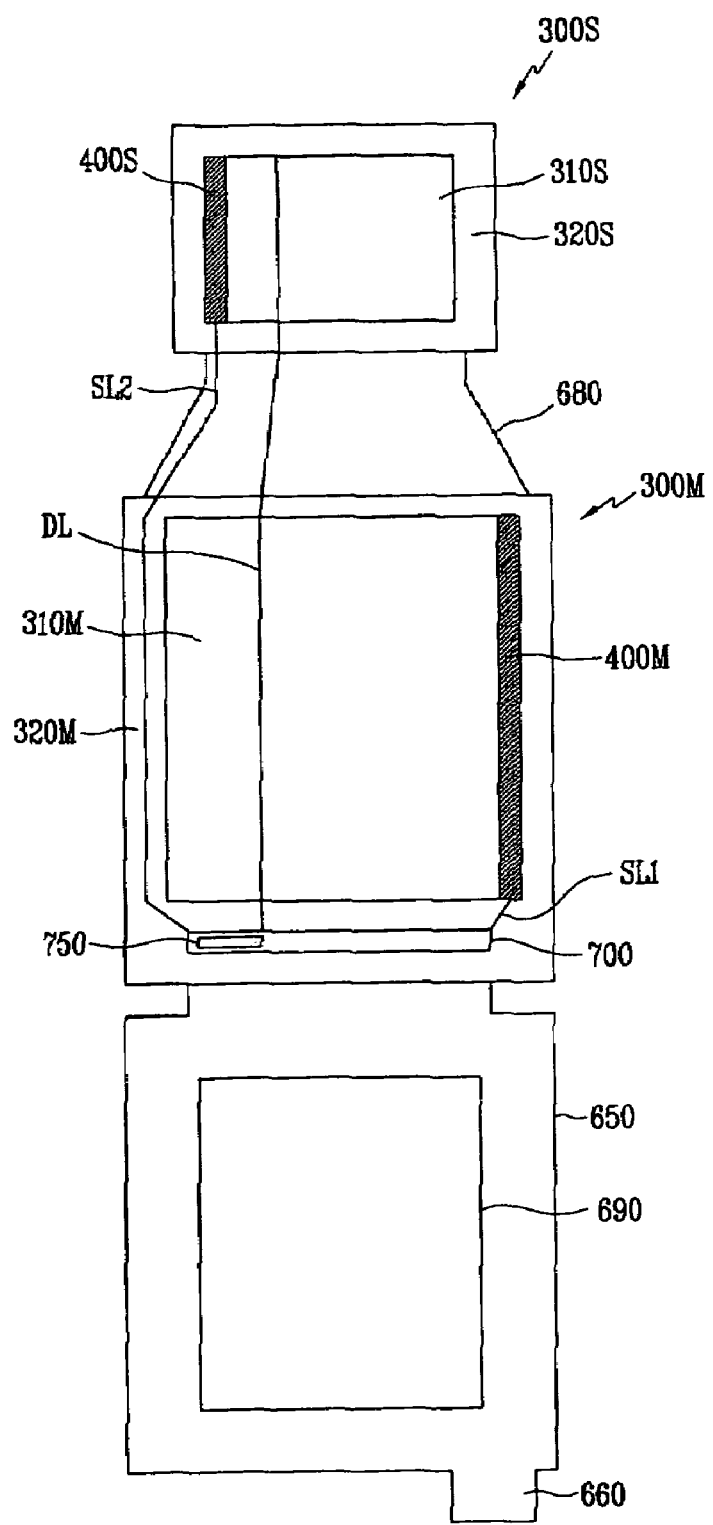
FIG. 1 is a schematic layout view of an LCD according to an exemplary embodiment of the present invention.

The present invention is described fully below with reference to the accompanying drawings, in which preferred embodiments of the invention are shown. This invention may, however, be embodied in many different forms and is not limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 2:
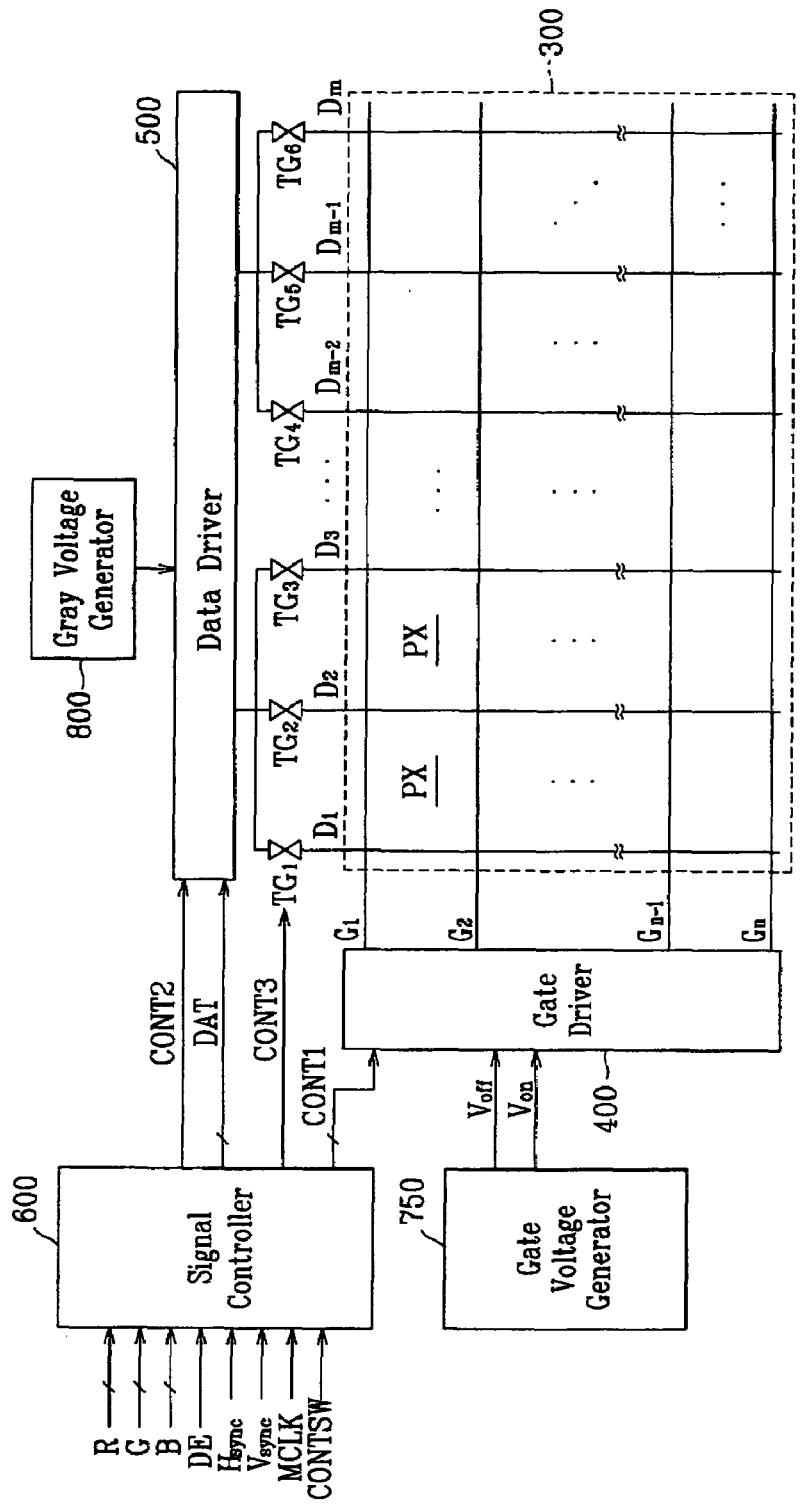
FIG. 2 is a block diagram of an LCD according to an exemplary embodiment of the present invention.
Figure 3:
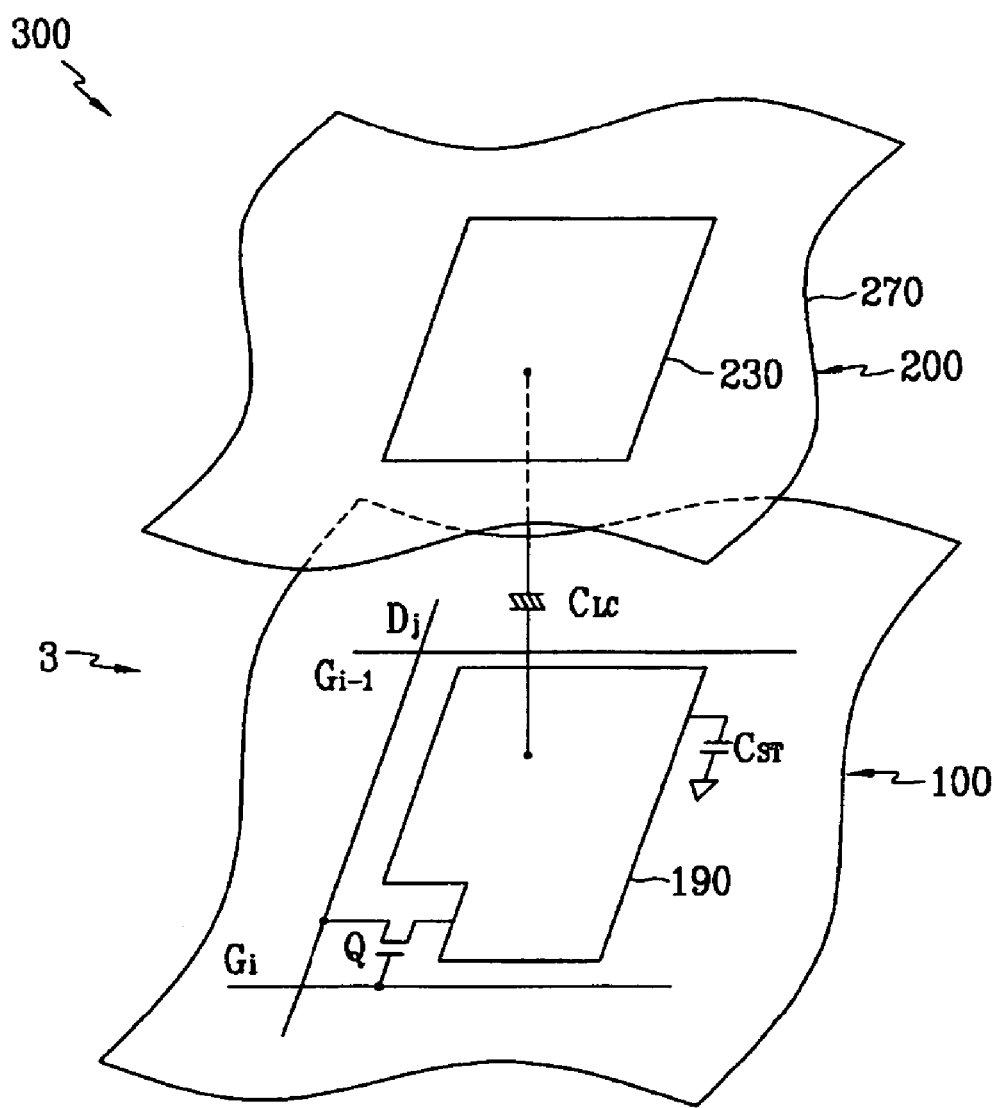
FIG. 3 illustrates a structure and an equivalent circuit diagram of a pixel of an LCD according to an exemplary embodiment of the present invention.

FIG. 1 is a schematic layout view of an LCD according to an exemplary embodiment of the present invention, FIG. 2 is a block diagram of an LCD according to an embodiment of the present invention, and FIG. 3 is an equivalent circuit diagram of a pixel of an LCD according to an embodiment of the present invention.

Referring to FIG. 1, an LCD according to an embodiment of the present invention includes two panel units, a main panel unit 300M and a subsidiary panel unit 300S. FPC 650 is attached to the main panel unit 300M, an auxiliary FPC 680 is attached between the main and the subsidiary panel units 300M and 300S, and an integration chip 700 is mounted on the main panel unit 300M.

The FPC 650 is attached to one side of main panel unit 300M and has an opening 690 exposing the subsidiary panel unit 300S in a folded state.

The FPC 650 includes a connector 660 where signals are inputted from an external device in the lower side thereof, and a plurality of signal lines (not shown) for electrically connecting the integration chip 700 to the panel units 300M and 300S. The signal lines form pads (not shown) in the connection points of the integration chip 700 and the attachment points of the panel units 300M and 300S by substantial enlargement thereof.

The auxiliary FPC 680 is attached between the other side of the main panel unit 300M and one side of the subsidiary panel unit 300S, and is provided with signal lines SL2 and DL for electrically connecting the integration chip 700 and the subsidiary panel unit 300S.

The panel units 300M and 300S include display areas 310M and 310S forming screens, and peripheral areas 320M and 320S, respectively. The peripheral areas 320M and 320S may include light-blocking layers (not shown) ("black matrix") for blocking light. The FPCs 650 and 680 are attached to the light-blocking areas of the peripheral areas 320M and 320S.

Each of the panel units 300M and 300S includes a plurality of display signal lines comprised of a plurality of gate lines $G_1$-$G_n$ and a plurality of data lines $D_1$-$D_m$, a plurality of pixels PX connected thereto and arranged substantially in a matrix, such as shown in FIG. 2, and a gate driver 400 which supplies signals to the gate lines. Most of the pixels PX and the display signal lines $G_1$-$G_n$ and $D_1$-$D_m$ are disposed in the display areas 310M and 310S, and the gate drivers 400M and 400S are located in the peripheral areas 320M and 320S.

Additionally, portions of the data lines $D_1$-$D_m$ are connected to the subsidiary panel unit 300S via the auxiliary FPC 680. That is, two panel units 300M and 300S share portions of the data lines $D_1$-$D_m$, and a line DL thereof is shown in FIG. 1.

The display signal lines $G_1$-$G_n$ and $D_1$-$D_m$ are provided on the lower panel 100 and include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and they are substantially parallel to each other, while the data lines $D_1$-$D_m$ extend substantially in a column direction and they are substantially parallel to each other. The pads of the FPC 650, the pads of the connectors 680M and 680S, and the pads of each of the panel units 300M and 300S are electrically connected to each other using solder or an anisotropic conductive film (ACF).

Each pixel PX includes a switching element Q connected to the display signal lines $G_1$-$G_n$ and $D_1$-$D_m$, and an LC capacitor $C_{LC}$ and a storage capacitor $C_{ST}$ that are connected to the switching element Q. Use of storage capacitor CST may not be required.

The switching element Q, which may be a TFT, is provided on the lower panel 100 and has three terminals: a control terminal connected to one of the gate lines $G_1$-$G_n$; an input terminal connected to one of the data lines $D_1$-$D_m$; and an output terminal connected to the LC capacitor CLC and the storage capacitor CST.

As shown in FIG. 3, the panel unit 300 includes the lower panel 100 and the upper panel 200 and an LC layer 3 interposed therebetween, and the display signal lines $G_1$-$G_n$ and D1-Dm and the switching element Q are provided on the lower panel 100.

The LC capacitor CLC includes a pixel electrode 190 provided on the lower panel 100, a common electrode 270 provided on the upper panel 200, and the LC layer 3 as a dielectric between the electrodes 190 and 270. The pixel electrode 190 is connected to the switching element Q, and the common electrode 270 covers the entire surface of the upper panel 200 and is supplied with a common voltage Vcom. Alternatively, both the pixel electrode 190 and the common electrode 270, which have shapes of bars or stripes, may be provided on the lower panel 100.

The storage capacitor $C_{ST}$ is an auxiliary capacitor for the LC capacitor CLC. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor CST includes the pixel electrode 190 and an adjacent gate line called a previous gate line, which overlaps the pixel electrode 190 via an insulator.

For color display, each pixel PX uniquely represents one of three primary colors such as red, green, and blue colors (spatial division), or sequentially represents the three primary colors in time (temporal division), thereby obtaining a desired color. FIG. 2 shows an example of the spatial division in which each pixel PX includes a color filter 230 representing one of the three primary colors in an area of the upper panel 200 facing the pixel electrode 190. Alternatively, the color filter 230 is provided on or under the pixel electrode 190 on the lower panel 100.

A pair of polarizers (not shown) for polarizing light are attached on outer surfaces of the lower and upper panels 100 and 200 of the panel unit 300.

A gate voltage generator 750 generates a gate-on voltage Von and a gate-off voltage Voff for application to the gate drivers 400M and 400S shown in FIG. 1.

The gate drivers 400M and 400S synthesize the gate-on voltage Von and the gate-off voltage Voff to generate gate signals for application to the gate lines $G_1$-$G_n$. The gate drivers 400M and 400S are formed together with switching elements Q of the pixels PX to be integrated, and are connected to the integration chip 700 via signal lines SL1 and SL2, respectively.

The integration chip 700 is supplied with external signals via signal lines provided on the connector 660 and the FPC 650, and supplies processed signals for control of the main panel unit 300M and the subsidiary panel unit 300S thereto via signal lines provided on the peripheral area 320M and the auxiliary FPC 680. The integration chip 700 includes the gate voltage generator 750, the gray voltage generator 800, the data driver 500, and the signal controller 600 shown in FIG. 2.

Gray voltage generator 800 generates one set or two sets of gray voltages related to transmittance of the pixels PX. When two sets of the gray voltages are generated, the gray voltages in one set have a positive polarity with respect to the common voltage Vcom, while the gray voltages in the other set have a negative polarity with respect to the common voltage Vcom.

The data driver 500 is connected to the data lines $D_1$-$D_m$ of the panel unit 300, and applies data voltages selected from the gray voltages supplied from the gray voltage generator 800 to the data lines $D_1$-$D_m$.

The signal controller 600 controls the gate driver 400 and the data driver 500.

The operation of the display device is described below in detail with the aid of FIGS. 1 and 2.

The signal controller 600 is supplied with image signals R, G, and B and input control signals controlling the display of the image signals R, G, and B from an external device (not shown). The input control signals include, for example, a vertical synchronization signal Vsync, a horizontal synchronization signal Hsync, a main clock MCLK, and a data enable signal DE. After generating gate control signals CONT1, data control signals CONT2 and switching control signals CONT3 and processing the image signals R, G, and B to be suitable for the operation of the panel units 300M and 300S in response to the input control signals, the signal controller 600 provides the gate control signals CONT1 to the gate drivers 400M and 400S, the processed image signals DAT and the data control signals CONT2 to the data driver 500, and the switching control signal CONT3 to transmission gates TG1-TG6.

The gate control signals CONT1 include a vertical synchronization start signal STV for informing the gate driver of a start of a frame, a gate clock signal CPV for controlling an output time of the gate-on voltage Von, and an output enable signal OE for defining a width of the gate-on voltage Von.

The data control signals CONT2 include a horizontal synchronization start signal STH for informing the data driver 500 of a start of a horizontal period, a load signal LOAD or TP for instructing the data driver 500 to apply the appropriate data voltages to the data lines $D_1$-$D_m$, a data clock signal HCLK, and an inversion control signal RVS for reversing the polarity of the data voltages (with respect to the common voltage Vcom).

The switching control signal CONT3 controls the transmission gates TG1-TG6 and has high and low levels.

The data driver 500 receives the processed image signals DAT for a pixel row from the signal controller 600, and converts the processed image signals DAT into the analogue data voltages selected from the gray voltages supplied from the gray voltage generator 800 in response to the data control signals CONT2 from the signal controller 600.

In response to the gate control signals CONT1 from the signal controller 600, the gate drivers 400M and 400S apply the gate-on voltage Von to the gate lines $G_1$-$G_n$, thereby turning on the switching elements Q connected to the gate lines $G_1$-$G_n$.

The data driver 500 applies the data voltages to corresponding data lines $D_1$-$D_m$ for a turn-on time of the switching elements Q (which is called "one horizontal period" or "1H" and equals one period of the horizontal synchronization signal Hsync, the data enable signal DE, and the gate clock signal CPV). The data voltages in turn are supplied to corresponding pixels PX via the turned-on switching elements Q.

The difference between the data voltage and the common voltage Vcom applied to a pixel PX is expressed as a charged voltage of the LC capacitor CLC, i.e., a pixel voltage. The liquid crystal molecules have orientations depending on a magnitude of the pixel voltage, and the orientations determine a polarization of light passing through the LC capacitor CLC. The polarizers convert light polarization into light transmittance.

By repeating the above-described procedure, all gate lines $G_1$-$G_n$ are sequentially supplied with the gate-on voltage Von during a frame, thereby applying the data voltages to all pixels PX. When a next frame starts after finishing one frame, the inversion control signal RVS applied to the data driver 500 is controlled such that a polarity of the data voltages is reversed ("frame inversion"). The inversion control signal RVS may be controlled such that the polarity of the data voltages flowing in a data line in one frame is reversed (e.g.: "row inversion", "dot inversion"), or the polarity of the data voltages in one packet is reversed (e.g.: "column inversion", "dot inversion").

An LCD according to embodiments of the present invention is described below in detail with reference to FIGS. 4-9.

Figure 4:
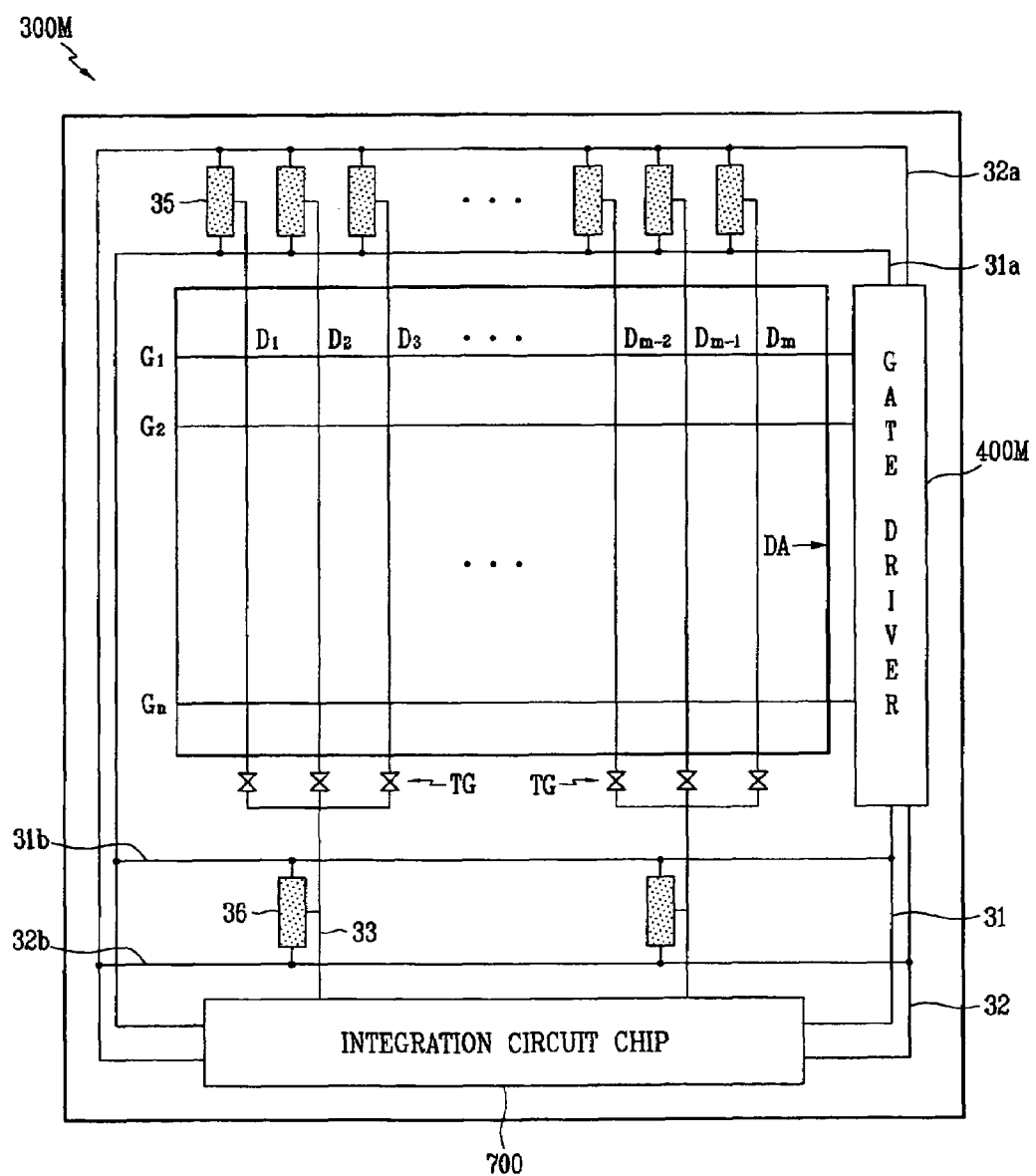
FIG. 4 is a schematic view of an LCD according to an exemplary embodiment of the present invention.
Figure 5:
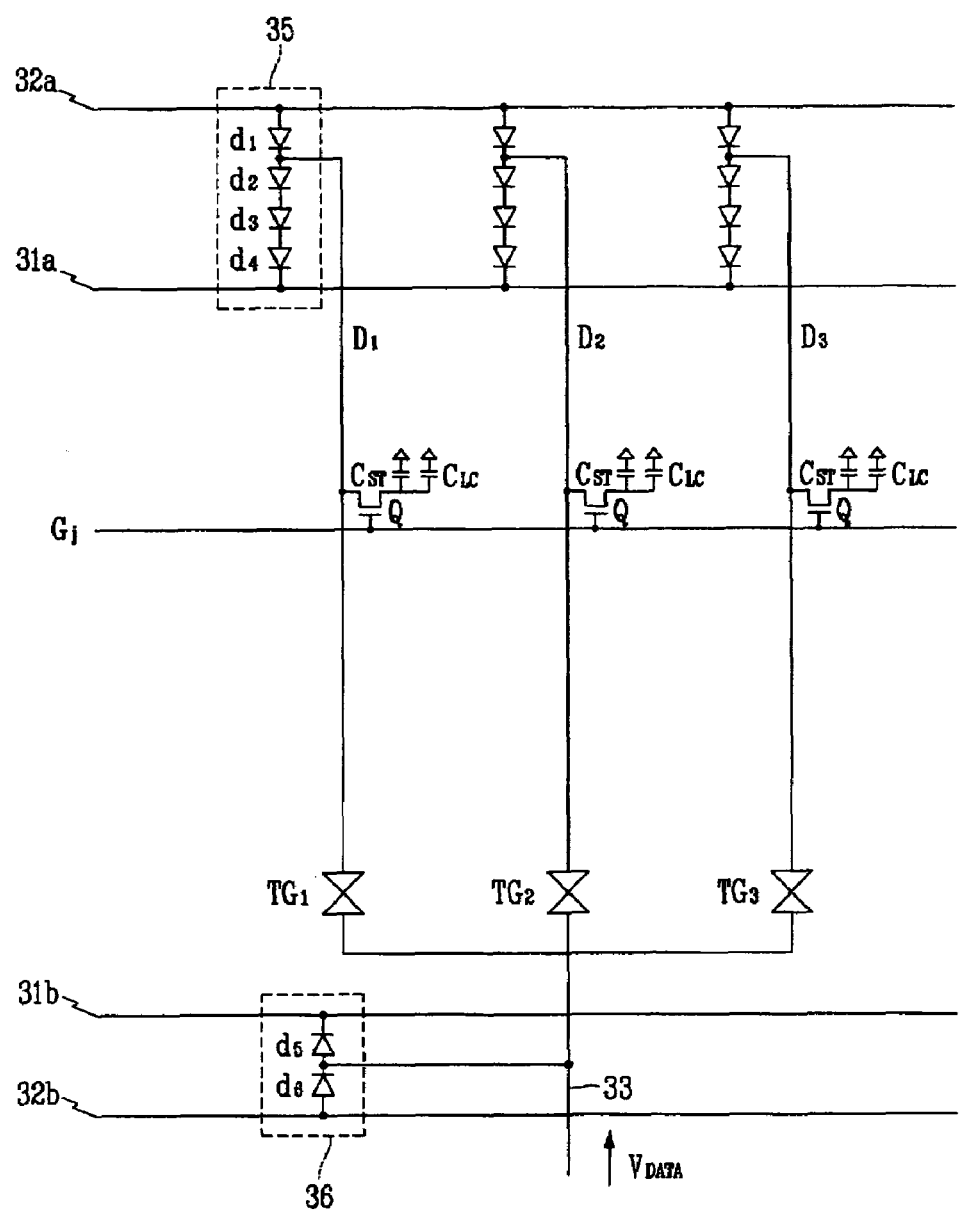
FIG. 5 is an enlarged view of a portion of the LCD shown in FIG. 4.

FIG. 4 is a schematic view of an LCD according to an exemplary embodiment of the present invention, and FIG. 5 is an enlarged view of a portion of the LCD shown in FIG. 4.

The main panel unit 300M is shown in FIG. 4, which will be described as an example.

Referring to FIG. 4, the integration chip 700 is disposed at the lower side of the panel unit 300M, and the gate driver 400M is integrated in the right thereof. High voltage lines 31, 31a, and 31b and low voltage lines 32, 32a, and 32b are connected in a ring shape between the integration chip 700 and the gate driver 400M in a clockwise direction or in a counter-clockwise direction at the peripheral area outside a display area DA.

The voltage lines 31 and 32 are connected between the integration chip 700 and gate driver 400M and the voltage lines 31a and 32a are connected therebetween in the counter clockwise direction and in the clockwise direction with respect to the integration chip 700, respectively. The voltage lines 31b and 32b are connected between the voltages lines 31 and 32 and the voltage lines 31a and 32a, respectively. The high voltage lines 31, 31a, and 31b are disposed in the inner side, the low voltage lines 32, 32a, and 32b are disposed in the outer side, and the high voltage lines 31 and 31a and the low voltage lines 32 and 32a are connected to each other via the gate driver 400M.

Each channel 33 of the integration chip 700 is connected to three transmission gates TG and each of the transmission gates TG is connected to one of the data lines $D_1$-$D_m$.

Additionally, diode units 35 and 36 are connected between two voltage lines 31a and 32a and two voltage lines 31b and 32b, respectively.

The diode unit 35 includes a plurality of diodes d1-d4 connected from the low voltage line 32a to the high voltage line 31a in a reverse biased direction, and the diode unit 36 also includes a plurality of diodes d5 and d6 connected from the low voltage line 32b to the high voltage line 31b also in a reverse biased direction.

In this case, the diode unit 35 is connected to the data lines $D_1$-$D_m$ and the diode unit 36 is connected to the channels 33. The data lines $D_1$-$D_m$ are connected between two diodes d1 and d2 and the channels are connected between two diodes d5 and d6.

In this way, current does not flow from the high voltage lines 31a and 31b to the low voltage lines 32a and 32b, and an electrostatic charge is released via the data lines $D_1$-$D_m$ or the channels 33 connected between the diodes d1 and d2 and the diodes d5 and d6, respectively, after penetration of the electrostatic charge into the center of the panel unit 300M.

When the diodes d1-d6 function as resistors at the time of their own turn-off and the resistances of the resistors are equal, a voltage between the two diodes d1 and d2 is a value found by using standard voltage divider techniques. For example, when a voltage in the high voltage line 31a is 3V and a voltage in the low voltage line 32a is 0V, the voltage between the two diodes d1 and d2 is 0.75V, which is applied to the data lines $D_1$-$D_m$ and thus the LC capacitor $C_{LC}$ is charged with the voltage identical thereto. However, the LC begins to operate in a range of 1V or more which is a threshold voltage thereof and thus does not operate in a range of the threshold voltage or less. For example, for an LCD of a normally black mode, the LC fails to operate at 0.75V, and thus a screen of the LCD expresses black.

Accordingly, when an LCD, for example on a mobile phone, is in a stand-by mode, even though the LC capacitor is charged due to current leakage, the screen does not display white stripes.

Similarly, diode unit 36 includes diodes d5 and d6 and channels 33 are connected to the common connection between diodes d5 and d6. A description for the diode unit 35 is also employed to the diode unit 36 hereinafter.

Although four diodes d1-d4 and two diodes d5 and d6 are shown in FIG. 5, the number thereof may be different.

As above, when the diodes d1-d4 have equal resistances, the data lines $D_1$-$D_m$ are asymmetrically connected between the diodes d1-d4, that is, are connected closer to the low voltage line 32a and thus a voltage in each of the data lines $D_1$-$D_m$ is less than the threshold voltage of the LC.

Figure 6A:
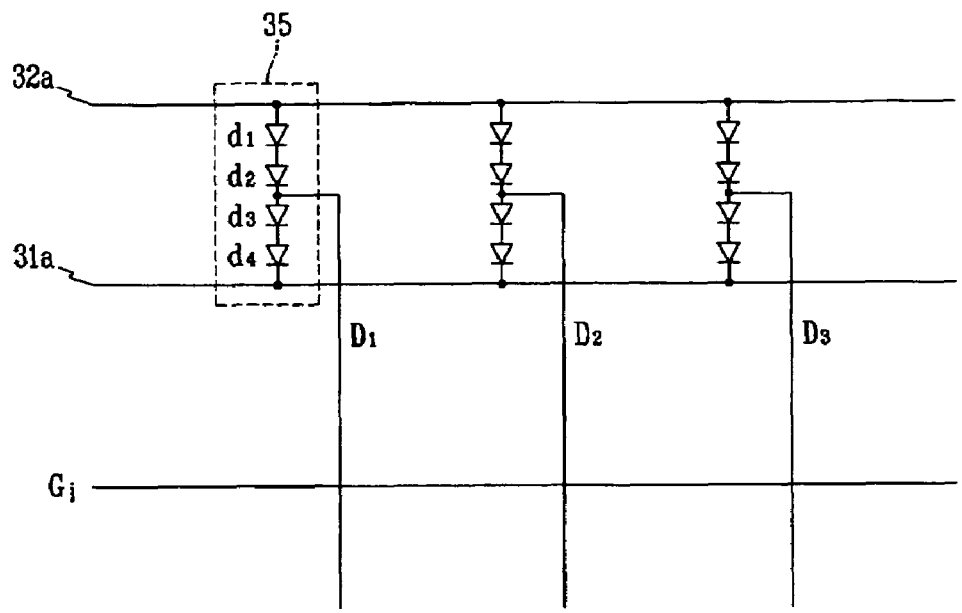
FIGS. 6A and 6B are circuit diagrams for another exemplary embodiment of the present invention.
Figure 6B:
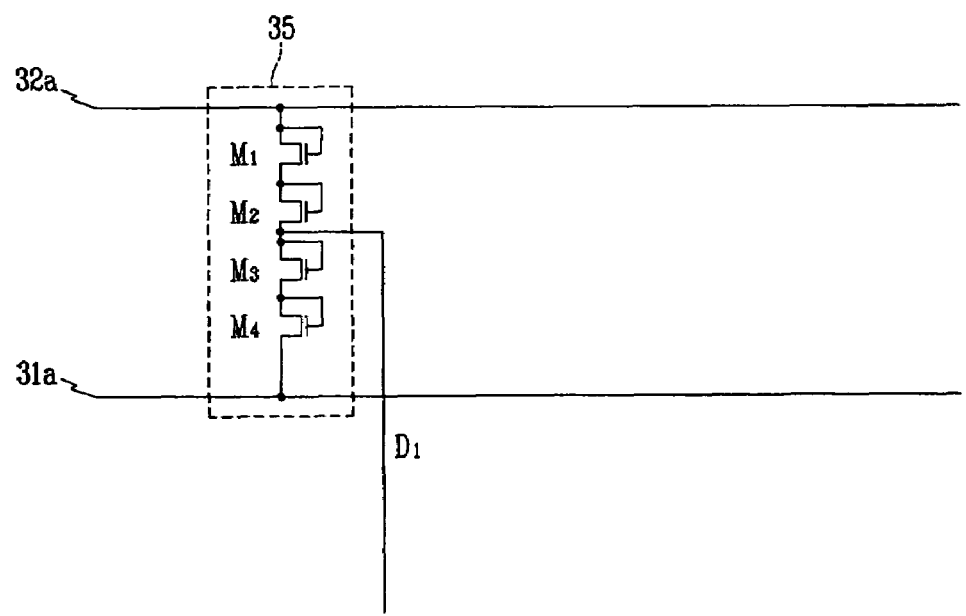

FIGS. 6A and 6B show a configuration for connection of the data lines $D_1$-$D_m$ to the diode unit 35 according to another embodiment of the present invention.

Referring to FIG. 6A, the data lines, for example the data line D1, are connected between two diodes d2 and d3 unlike that shown in FIG. 5, which has a symmetrical configuration in which the diodes are disposed by the same number with respect to a point of contact between the two diodes d2 and d3.

In this case, each of the diodes d1-d4 may be implemented by, for example, NMOS transistors M1-M4 each having a gate and a drain connected to each other, as shown in FIG. 6B. In the transistors M1-M4, a width and a length of a channel is adjusted to regulate a drain current for adjusting a resistance. That is, the drain current is in proportion to the width of the channel and is in reverse proportion to the length thereof, and the width of the channel for the two transistors M1 and M2 is larger than that for the two transistors M3 and M4 and thus resistances for the two transistors M1 and M2 are smaller than those for the two transistors M3 and M4, thereby obtaining the same voltage as that shown in FIG. 5.

Voltages developed in the high voltage lines 31a and 31b are blocked or reduced and thus voltages developed in the data lines are reduced, which is described below referring to FIGS. 7-9.

Figure 7:
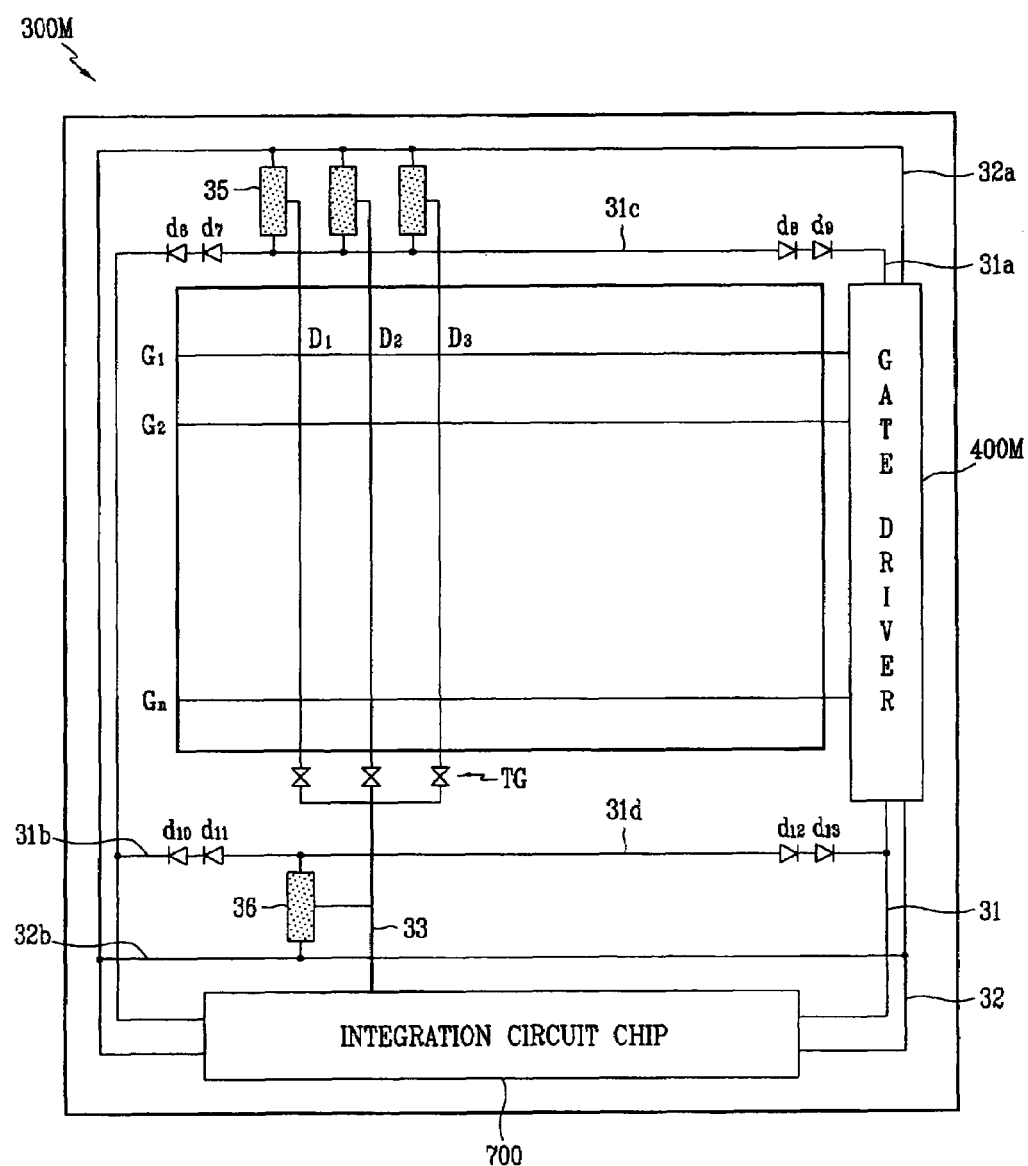
FIGS. 7-9 are exemplary circuit diagrams according to another embodiment of the present invention.
Figure 8:
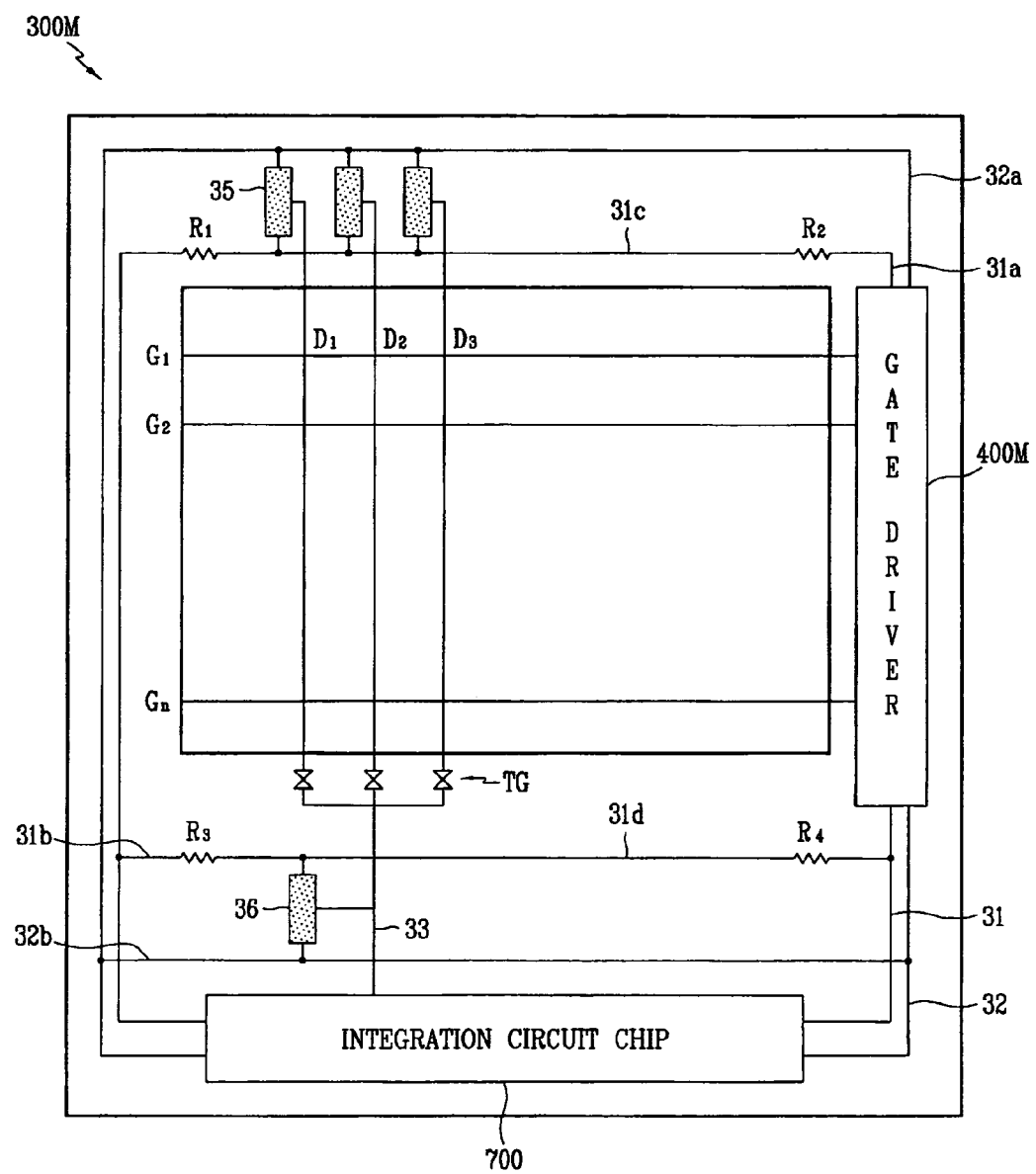
Figure 9:
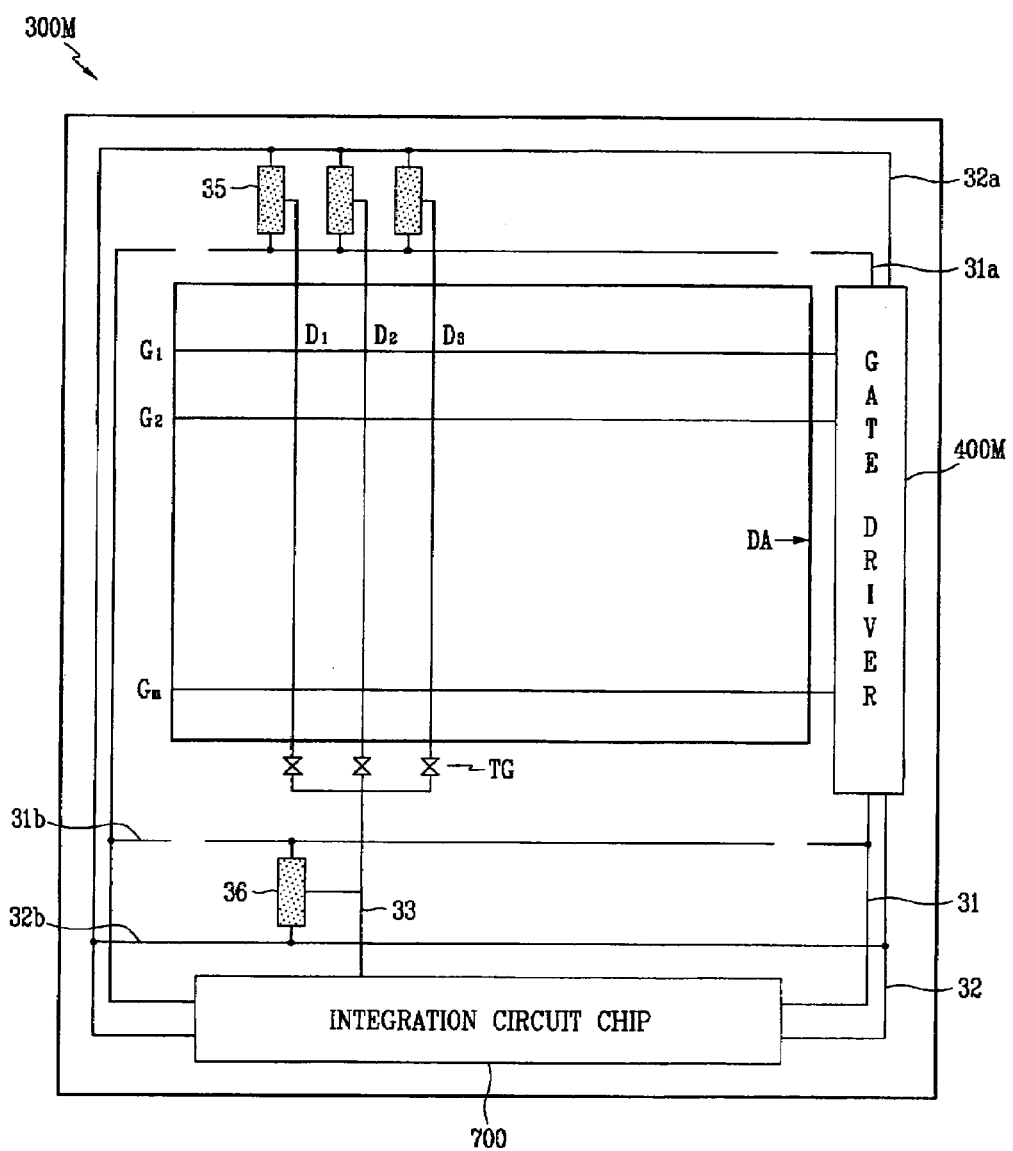

FIGS. 7-9 show configurations of an LCD according to other embodiments of the present invention.

For FIG. 7, diodes d3-d13 are disposed on the high voltage lines 31a and 31b. In FIG. 8, resistors R1-R4 are disposed on the high voltage lines 31a and 31b; and in FIG. 9, the high voltage lines 31a and 31b are open.

Referring to FIG. 7, the integration chip 700 applies a constant voltage, i.e., 3V exemplified above in the counter clockwise direction, i.e., toward the gate driver 400M, while it also applies a constant voltage in the clockwise direction. The voltage is transmitted to the high voltage line 31a via the gate driver 400M in the counter clockwise direction, and is transmitted thereto in the clockwise direction. In the counter-clockwise direction at the right, the diodes d12 and d13 are disposed in a reverse biased direction, and the diodes d8 and d9 are also disposed in a reverse biased direction at the output side of the gate driver 400M. Likewise, in the clockwise direction at the left, the diodes d10 and d11 are disposed in the reverse biased direction, and the diodes d6 and d7 are also disposed in the reverse biased direction as well.

Accordingly, the high voltage line portions 31c and 31d which are connected to diode units 35 and 36 respectively do not have a voltage applied thereto due to the diodes d6-d13, and therefore are substantially in a floating state. Thus, although a little current flow leaks in the high voltage lines 31c and 31d, voltages developed in the data lines $D_1$-$D_m$ connected to the diode units 35 and 36 are caused to be less than the threshold voltage of the LC.

Referring to FIG. 8, resistors R1-R4 are disposed at the positions of the diodes d5-d12. Accordingly, the high voltage lines 31a and 31b provide a lower voltage than the above exemplified 3V due to a voltage drop by the resistors R1-R4, and thus voltages developed in the data lines $D_1$-$D_m$ which are connected to high voltage line portion 31c are lower.

The embodiments shown in FIGS. 7-9 are applicable together with those shown in FIGS. 5-6B. For example, for that shown in FIG. 7, positions of the data lines $D_1$-$D_m$ connected to the diode units 35 and 36 are made to be asymmetrical.

In this way, the data lines $D_1$-$D_m$ are connected asymmetrically to the diode units 35 and 36 having the same resistances, or are connected symmetrically to the diode units 35 and 36, characteristics of which are varied to reduce the voltages in the data lines $D_1$-$D_m$. Additionally, the leaked current is reduced.

Moreover, the high voltage lines are open, or the resistors or the diodes in the backward direction are disposed on the high voltage lines, and thus the voltages applied to the high voltage lines are reduced or blocked, thereby reducing the voltage in the data lines. Accordingly, the voltage in each of the data lines is caused to be less than the threshold voltage, thereby preventing a stripe fault.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display including a panel unit having first and second panels and a liquid crystal layer interposed between the two panels, comprising: a plurality of pixels each including a switching element; gate lines and data lines connected to the switching elements; a gate driver circuit for applying gate signals to the gate lines; a driving circuitry chip for applying data voltages to the data lines; a plurality of transmission gates connected between the data lines and the driving circuitry chip; first to third voltage lines disposed along an edge of the panel unit in a ring shape; fourth to sixth voltage lines disposed along an edge of the panel unit in a ring shape, and disposed at outer sides of the first to third voltage lines, respectively; a first diode unit including a first diode group connected in series between the second voltage line and the fifth voltage line, wherein the first diode group includes a plurality of diodes; and a second diode unit including a second diode group connected in series between the third voltage line and the sixth voltage line, wherein the second diode group includes a plurality of diodes, wherein one end of each of the data lines is connected to a first common connection point between two of the series connected diodes group and the other end of the data lines is connected to a second common connection point between two of the series connected diodes in the second diode group via a transmission gate, and further wherein at least one of the first common connection point between the data lines and the first diode group and the second common connection point of contact between the data lines and the second diode group is less than a threshold voltage of the liquid crystal.

2. The liquid crystal display of claim 1, wherein the first and second diode groups are connected in a reverse biased direction.

3. The liquid crystal display of claim 2, wherein the first common connection point is positioned close to the fifth voltage line.

4. The liquid crystal display of claim 2, wherein the second common connection point of contact is positioned close to the sixth voltage line.

5. The liquid crystal display of claim 2, wherein the first and second common connection points are positioned close to the fifth and sixth voltage lines, respectively.

6. The liquid crystal display according to any of claims 3, 4, or 5, wherein the diodes are comprised of transistors, the gates and drains of which are connected to each other, respectively, and have equal resistances at the time of their own turn-off.

7. The liquid crystal display of claim 2, wherein the first and second common connection points are positioned at centers of the first and second diode groups, respectively.

8. The liquid crystal display of claim 7, wherein the diodes are comprised of transistors, the gates and drains of which are connected to each other, wherein at least one of a resistance of diodes positioned between the first common connection point the fifth voltage line and a resistance of diodes positioned between the second common connection point of contact and the sixth voltage line is less than at least one of a resistance of diodes positioned between the second common connection point and the second voltage line and a resistance of diodes positioned between the second common connection point and the third voltage line.

9. The liquid crystal display of claim 2, further comprising a gate voltage generator generating a gate-on voltage for turning on the switching element and a gate-off voltage for turning off the switching element.

10. The liquid crystal display of claim 9, wherein the driving circuitry chip comprises the gate voltage generator.

11. The liquid crystal display of claim 2, wherein the driving circuitry chip is mounted on the panel unit as a COG (chip on glass) type.

12. The liquid crystal display of claim 2, wherein the gate driver is integrated on the panel unit.

* * * * *